(12) United States Patent
Ottersten et al.

(10) Patent No.: US 11,552,690 B2
(45) Date of Patent: Jan. 10, 2023

(54) HANDLING BEAM PAIRS IN A WIRELESS NETWORK

(71) Applicant: Telefonaktiebolaget LM Ericsson (publ), Stockholm (SE)

(72) Inventors: Johan Ottersten, Stockholm (SE); Hugo Tullberg, Nyköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 95 days.

(21) Appl. No.: 17/059,863

(22) PCT Filed: Jun. 25, 2018

(86) PCT No.: PCT/SE2018/050677
§ 371 (c)(1),
(2) Date: Nov. 30, 2020

(87) PCT Pub. No.: WO2020/005121
PCT Pub. Date: Jan. 2, 2020

(65) Prior Publication Data
US 2021/0258063 A1 Aug. 19, 2021

(51) Int. Cl.
*H04B 7/06* (2006.01)
*H04L 41/147* (2022.01)
(Continued)

(52) U.S. Cl.
CPC ......... *H04B 7/0695* (2013.01); *H04L 41/147* (2013.01); *H04W 24/04* (2013.01); *H04W 24/10* (2013.01)

(58) Field of Classification Search
CPC .... H04L 41/147; H04W 24/10; H04W 16/28; H04W 24/02; H04W 24/04; H04W 76/19; H04B 7/0695; H04B 7/088
See application file for complete search history.

(56) References Cited

U.S. PATENT DOCUMENTS

2018/0131434 A1\* 5/2018 Islam .................. H01Q 3/2605
2018/0324780 A1 11/2018 Novlan et al.
(Continued)

FOREIGN PATENT DOCUMENTS

WO 2018034713 A1 2/2018

OTHER PUBLICATIONS

International Search Report and Written Opinion dated Apr. 15, 2019 for International Application No. PCT/SE2018/050677 filed on Jun. 25, 2018, consisting of 12-pages.
(Continued)

*Primary Examiner* — Derrick V Rose
(74) *Attorney, Agent, or Firm* — Christopher & Weisberg, P.A.

(57) ABSTRACT

A method performed by a first radio node for handling a beam pair with a second radio node is provided. The first radio node receives a first information from one or more other radio nodes. The first information comprises a number of quality values related to a number of beam pairs. The first radio node predicts a time to failure for a first beam pair. The first radio node then decides whether or not there is enough time until the predicted time to failure, for performing a beam pair switch from the first beam pair to a second beam pair. When there is enough time, the first radio node switches to the second beam pair before the predicted time to failure. When there is not enough time, the first radio node prepares an upcoming beam pair failure.

18 Claims, 11 Drawing Sheets

(51) Int. Cl.
*H04W 24/04* (2009.01)
*H04W 24/10* (2009.01)

(56) References Cited

U.S. PATENT DOCUMENTS

2020/0373989 A1* 11/2020 Yan ..................... H04B 7/0617
2021/0218457 A1* 7/2021 Xu ..................... H04W 72/046

OTHER PUBLICATIONS

3GPP TSG RAN WG1 Meeting #88b R1-1704230; Title: Link recovery procedure for beam failure; Agenda Item: 8.1.2.2.2; Source: Huawei, HiSilicon; Document for: Discussion and decision; Date and Location: Apr. 3-7, 2017, Spokane, USA, consisting of 7-pages.
3GPP TSG RAN WG1 Meeting 90bis R1-1718742; Title: Performance of beam management without beam indication; Agenda Item: 7.2.2.6; Source: Ericsson; Document for: Discussion and decision; Date and Location: Oct. 9-13, 2017, Prague, CZ, consisting of 11-pages.
3GPP TSG-RAN WG2 Meeting 97bis R1-1702770; Title: RLM and RLF in HF NR; Agenda Item: 10.2.3.3; Source: Media Tek Inc.; Document for: Discussion and decision; Date and Location: Apr. 3-7, 2017, Spokane, US, consisting of 5-pages.
EPO Communication and Search Report dated Jan. 14, 2022 for Patent Application No. 18924011.2, consisting of 9-pages.
3GPP TSG RAN WG1 Meeting #88bis R1-1705343; Title: Discussion on recovery from beam failure; Agenda Item: 8.1.2.2.2; Source: Samsung; Document for: Discussion and Decision; Date and Location: Apr. 3-7, 2017, Spokane, USA, consisting of 6-pages.

* cited by examiner

HANDLING BEAM PAIRS IN A WIRELESS NETWORK

CROSS-REFERENCE TO RELATED APPLICATIONS

This application is a Submission Under 35 U.S.C. § 371 for U.S. National Stage Patent Application of International Application Number: PCT/SE2018/050677, filed Jun. 25, 2018 entitled "HANDLING BEAM PAIRS IN A WIRELESS NETWORK," the entirety of which is incorporated herein by reference.

TECHNICAL FIELD

Embodiments herein relate to a first radio node and methods therein. In particular, they relate to handling a beam pair with a second radio node in a wireless communication network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

To meet traffic demands in future wireless communication systems, new frequency bands are being considered, for example in the range of 30-100 GHz. These bands offer wide spectrum for high data rate communications. However, the coverage range is limited because of the system and channel characteristics. The propagation loss is higher for long range communications at high frequencies. A promising technology to overcome the range limitations is based on multi-antenna strategies. Massive Multiple-Input, Multiple-Output (MIMO) provides a large number of antenna elements, allowing beamforming of narrow beams and steering the signal towards a specific direction overcoming the high path loss for long range communication.

An important part to deal with in future systems such as New Radio (NR), also referred to as 5G, is beam management. Beam management relates to finding and maintaining the best beam pair between a transmitter TX in a transmitting radio node and a receiver RX in a receiving radio node. This may comprise three processes, P1, P2 and P3.

P1 relates to an initial access where the TX sends Synchronized Signal (SS) blocks in form of wide beams to establish initial beams for the TX and the RX. During P1, the TX and the RX performs a sweep, where they search through all available wide beams to find a best beam pair. A beam pair when used herein is a communication link between a TX in one node and an RX in another node, in which both nodes use beamforming.

P2 relates to refining the initial beam at the TX in the transmitting radio node and P3 relates to refining the initial beam at the RX in the receiving radio node. This establishes a link made up of two narrow beams between the transmitting radio node and the receiving radio node, which increases the gain and provides better communication.

P2 and P3 may either be done separately or jointly. A separate P2 and P3 sweep involves refining the beam at TX first, keeping the RX beam fixed, before refining the RX beam, keeping the TX beam fixed. In a joint P2 and P3 sweep, the TX and RX search through the available beams simultaneously. Beam indication is a procedure to exchange information between the TX and the RX to allow them to switch beams simultaneously. This is only required in the joint P2 and P3 sweep, otherwise the TX and the RX may adjust their beams without indication. In the separate sweep, all of the beam pair combinations are not observed and therefore it requires less overhead compared to the joint P2 and P3 sweep which performs an exhaustive search through all of the beams to find the best pair. In scenarios where there are many reflections there is a need to switch beams simultaneously to maintain the communication link. In these scenarios it is not useful to rely on the separate P2 and P3 sweep because the communication link may fail. Here, it is needed to use the joint P2 and P3 sweep because it is needed to switch TX and RX beams simultaneously.

In future 5G scenarios where there will be a large number of antenna elements, hence a large number of beams, the processes P1, P2 and P3 will be very costly in terms of overhead, and delay.

Beam failure is a situation where a serving beam fails. This is a situation that is likely to happen in 5G scenarios where it is tended towards smaller cells where there will be more interference. There is also lot of movement of radio nodes, such as user equipment, and blockage of the communication link may occur, which may lead to beam link failing. Beam failure requires beam recovery mechanisms that may be costly in terms of overhead and delay, essentially going through the P1, P2 and P3 processes again.

Therefore problems with existing techniques are that the beam refinement processes P2 and P3, taking place after the establishment of the initial TX and RX beams P1, may be costly in terms of signaling overhead and delay. Especially in high frequencies where there is a large number of antenna elements able to form many narrow beams. This is because Channel State Information-Reference Signals (CSI-RS) need to be reported for the selected number of narrow beams during the refinement process. The selected number of narrow beams spans an area of an SS block beam used in P1. The number of beams may vary but is typically high and therefore a large number of CSI-RS would need to be reported. A separate P2 and P3 sweep requires less CSI-RS reporting while a joint P2 and P3 sweep requires more because all of the possible beam pair combinations are swept. In scenarios where there are for example many reflections and the need to switch beams simultaneously, it is not suitable to rely on the separate P2 and P3 sweep without beam indication which would require less overhead. It is preferable to use the joint P2 and P3 with beam indication. This increases complexity, overhead and delay because of the increased CSI-RS reporting required.

Beam failures require a restart of the entire P1, P2 and P3 processes to recover a beam pair. It may be very costly to restart the processes, especially in the occurrence of multiple beam failures in the same transmission.

SUMMARY

An object of embodiments herein is to improve the performance of a wireless communications network using multiple beams.

According to a first aspect of embodiments herein, the object is achieved by a method performed by a first radio node for handling a beam pair with a second radio node. The first radio node, the second radio node and one or more other radio nodes operate in a wireless communication network. The first radio node receives a first information from the respective one or more other radio nodes. The first information comprises a number of quality values related to a number of beam pairs. Each beam pair out of the number of beam pairs is associated to at least one quality value out of the number of quality values. The first radio node then predicts a time to failure for a first beam pair between the first radio node and the second radio node, which first beam pair has a first quality value, and wherein the predicting is based on the first quality value and the number of quality values. After predicting a time to failure, the first radio node decides whether or not there is enough time until the predicted time to failure, for performing a beam pair switch from the first beam pair to a second beam pair between the first radio node and the second radio node. When there is enough time, the first radio node switches to the second beam pair before the predicted time to failure. When there is not enough time, the first radio node prepares an upcoming beam pair failure.

According to a second aspect of embodiments herein, the object is achieved by a first radio node for handling a beam pair with a second radio node. The first radio node, the second radio node and one or more other radio nodes are operable in a wireless communications network. The first radio node is configured to:

Receive a first information from respective one or more other radio nodes. The first information is adapted to comprise a number of quality values related to a number of beam pairs. Each beam pair out of the number of beam pairs is adapted to associate to at least one quality value out of the number of quality values.

Predict a time to failure for a first beam pair between the first radio node and the second radio node. The first beam pair is adapted to have a first quality value. The predicting is adapted to be based on the first quality value and the number of quality values.

Decide whether or not there is enough time until the predicted time to failure for performing a beam pair switch from the first beam pair to a second beam pair between the first radio node and the second radio node.

When there is enough time, switch to the second beam pair before the predicted time to failure.

When there is not enough time, prepare an upcoming beam pair failure.

By predicting the time to the beam failure, it is possible to prevent a beam failure by switching to another beam pair before it occurs, if there is enough time. Thereby a large number of beam failures are avoided when using many antenna elements.

This in turn improves the performance of a wireless communications network using multiple beams.

An advantage of embodiments herein is that the complexity overhead and delay will be reduced by the prediction of beam failures and preventing them from happening.

Another advantage of embodiments herein is that more consistent communication performance and improved user experience is achieved, when the beam failure is prevented.

BRIEF DESCRIPTION OF THE DRAWINGS

Examples of embodiments herein are described in more detail with reference to attached drawings in which.

DETAILED DESCRIPTION

Embodiments herein are based on the insight that by predicting time to beam failures, the beam failures may be prevented by switching to another beam if there is enough time. This will lead to improved user quality of experience and improved performance of a wireless communications network using multiple beams.

Figure 1:
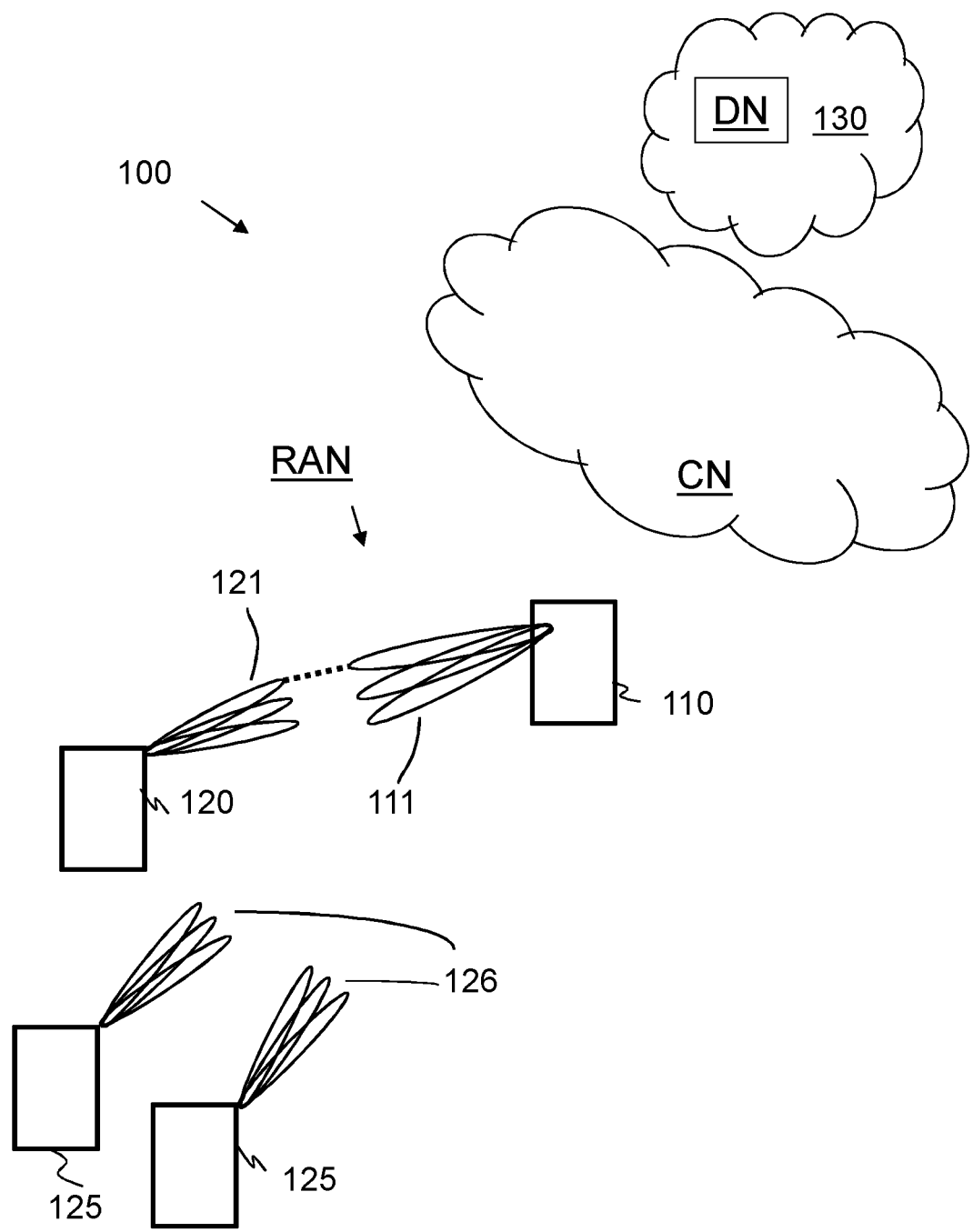
FIG. 1 is a schematic block diagram illustrating embodiments of a wireless communications network.

FIG. 1 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, W-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a first radio node 110, a second radio node 120 and one or more other radio nodes 125 providing radio coverage by means of antenna beams, referred to as beams herein.

The a first radio node 110 comprises multiple beams 111 and may use these beams for communicating with e.g. the second radio node 120 and the other radio nodes 125.

The second radio node 120 may also comprise multiple beams 121 and may use these beams for communicating with e.g. the first radio node 110 and the other radio nodes 125.

The other radio nodes 125 may also comprise multiple beams 126 and may use these beams for communicating with e.g. the first radio node 110 and the second radio node 120.

The first radio node 110 may e.g. be a base station and the second radio node may be a UE, or the other way around, the first radio node 110 may e.g. be a UE and the second radio node may be a base station.

In some further embodiments, the first radio node 110 may e.g. be a UE and the 15 second radio node may be a UE.

The other radio nodes 125 may e.g. be either base stations or UEs.

In case being a base station, the first/second/other second radio node 110/120/125 provides radio coverage over a geographical area by means of antenna beams. The geographical area may be referred to as a cell, a service area, beam or a group of beams. The first/second/other radio node 110/120/125 may in this case be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell served by first/second/other radio node 110/120/125 depending e.g. on the radio access technology and terminology used.

In case being a UE, the first/second/other radio node 110/120/125 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. radio access networks (RAN), to one or more core networks (CN). It should be understood by the skilled in the art that the second radio node and the other radio node relate to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

The methods according to embodiments herein are performed by the first radio node 110 which e.g. may be any one out of a network node and a UE.

As an alternative, a Distributed Node DN and functionality, e.g. comprised in a cloud 130 as shown in FIG. 1 may be used for performing or partly performing the methods.

An advantage of a cloud implementation of embodiments herein is that data may be shared between different machine learning models. This will be further described later on. Embodiments herein are based on predicting when beam failures occur for enabling switching to another beam pair before the beam failures happen. This will avoid a restart of the P1, P2 and P3 processes which are costly in terms of delay and overhead. Embodiments herein may be suitable for different beamforming schemes such as analogue beamforming and hybrid beamforming.

The embodiments herein, where the prevention of beam failures is addressed, are described for a single user case. However, they apply for multiple users as well.

Figure 2:
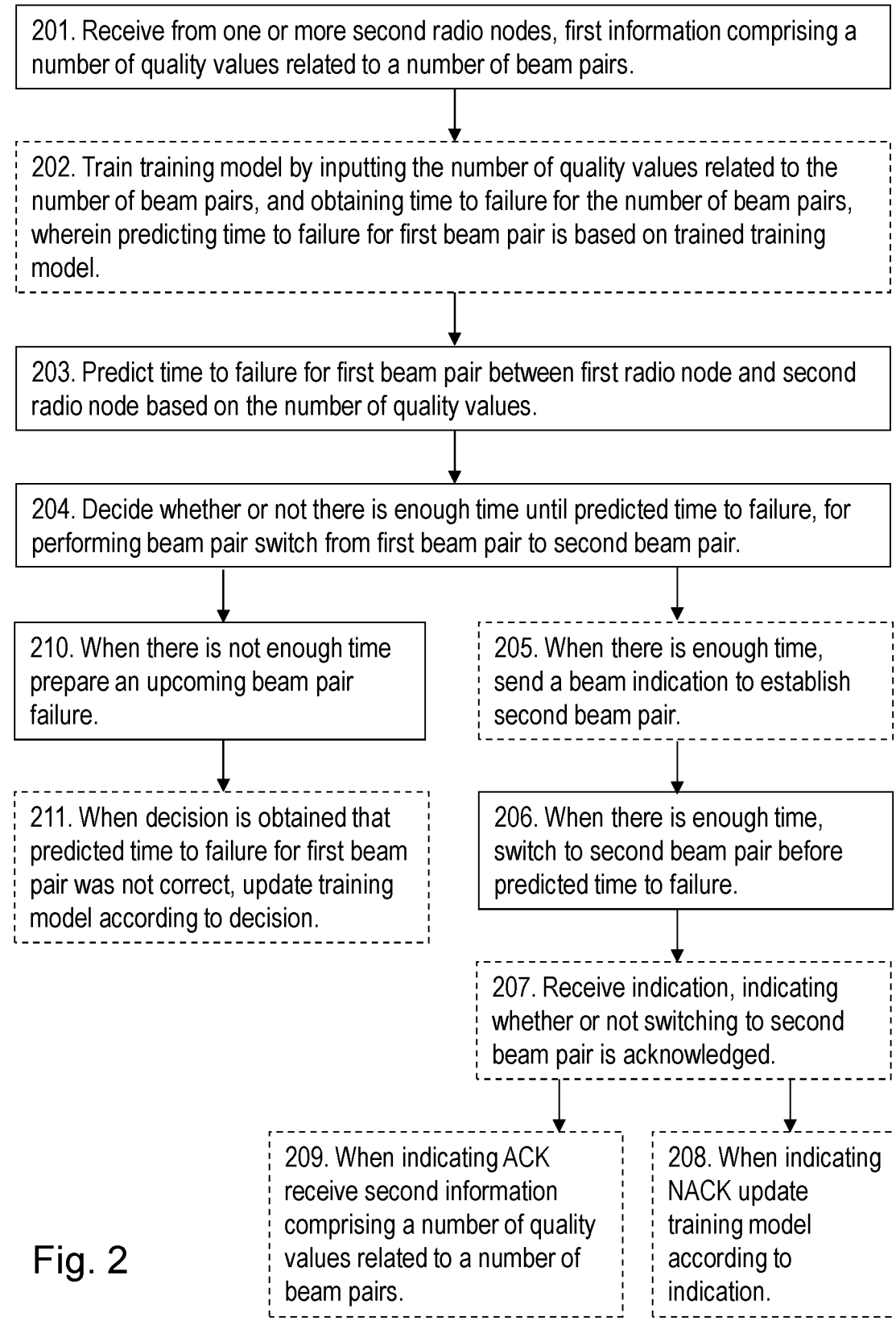
FIG. 2 is a flowchart depicting embodiments of a method in a radio node.

Example embodiments of a method for handling a beam pair between the first radio node 110 and the second radio node 120, will now be described with reference to a flowchart depicted in FIG. 2. As mentioned above, the first radio node 110, the second radio node 120 and other radio nodes 125 operate in the wireless communication network 100.

The method may be performed by anyone out of: the first radio node 110, the 30 second radio node 120, and a cloud 130.

According to an example scenario there is a lot of network traffic between radio nodes in the wireless communication network 100, and hence a large number of beam pairs are used. Due to the greatly increased amount of traffic in radio communication networks a number of these beam pairs will probably fail. To overcome this, embodiments herein provide switching to another beam pair, if there is enough time before an expected beam failure. Therefore a predicted time to failure need to be decided so that a beam failure may be prevented, if it is possible. In some embodiments, a machine learning model is used to predict the time to failure.

The method comprises the following actions, which actions may be taken in any suitable order. Actions that are optional are presented in dashed boxes in FIG. 2.

Action 201

According to an example scenario, the first radio node 110 collects quality values of beam pairs between the first radio node 110 and one or more other radio nodes 125 over a time period. This is to learn about the behaviour of different beam pairs, their quality and when they fail. This knowledge will be used, at a later stage, to predict a time to failure in an upcoming beam pair.

Therefore, in this action the first radio node 110 receives a first information from the respective one or more other radio nodes 125. The first information comprises a number of quality values related to a number of beam pairs. Each beam pair out of the number of beam pairs is associated to at least one quality value out of the number of quality values. This may e.g. be received in a report such as a CSI-RS report.

Action 202

As mentioned above it is advantageous to learn about the behaviour of different beam pairs, their quality and when they fail, to later on be able to predict a time to failure for a specific beam pair. In some embodiments this is learned by training a training model. According to some embodiments this may be performed by inputting the number of quality values related to the number of beam pairs, and obtaining the time to failure for the respective beam pair out of the number of beam pairs. This will be described more in detail below.

Action 203

According to the example scenario, the first radio node 110 now communicates with the second radio node 120 using a specific first beam pair. A beam failure for the first beam pair may be prevented by switching to another beam pair if there is enough time until the predicted time to failure. Thus, the first radio node 110 predicts the time to failure for the first beam pair between the first radio node 110 and the second radio node 120. The first beam pair has a first quality value. The predicting is based on the first quality value and the number of quality values. How this is performed will be described below. The number of quality values relate to the quality values of the beam pairs obtained from respective one or more other radio nodes 125 in action 201. The first quality value relates to the specific first beam pair. Any of the number of quality values and the first quality values are preferably the same type of quality values, which e.g. may be anyone out of: CSI-RS values, BLER, Signal-to-Noise Ratio (SNR), Signal-to-Interference-plus-Noise Ratio (SINR), traffic information, any possible features conveying information of the communication link, communication environment, propagation characteristics.

In the embodiments wherein the training model has been trained, in action 202, the predicting of the time to failure for the first beam pair may be based on the first quality values and the trained training model representing the number of quality values.

Action 204

According to the example scenario, a decision may be taken whether or not to switch to a new beam pair when the time to failure is predicted. Therefore the first radio node 110 decides whether or not there is enough time until the predicted time to failure for performing a beam pair switch from the first beam pair to a second beam pair between the first radio node 110 and the second radio node 120. The decision may be based on comparing the minimum time it takes to switch to a new beam pair with the predicted time to a beam failure.

Action 205

The minimum time to switch beams may also include the time it takes to send a beam indication. A beam indication is information exchanged between the TX and RX so that it is possible to switch beams at both nodes simultaneously. According to some embodiments, when there is enough time, the first radio node 110 sends a beam indication to the second radio node 120 for establishing the second beam pair, before switching to the second beam pair. This is needed for simultaneous switching. The establishing of the second beam pair will be further described below.

Action 206

According to embodiments herein a beam failure may be avoided in situations when there is enough time to switch to a new beam pair. So when there is enough time, the first radio node 110 switches to the second beam pair before the predicted time to failure.

Action 207

When the first radio node 110 has switched to the second beam pair it may be useful to know if the switching was correct. This knowledge may be used to update the training model. According to some embodiments the first radio node 110 may thus receive an indication, after switching to the second beam pair, indicating whether or not the switching to the second beam pair is acknowledged. The indication may for example include that the beam pair link of the second beam pair was correctly established and that there was a successful beam pair handover or in other cases that there was an unsuccessful beam pair handover.

Action 208

The training model may be updated based on an accuracy of the prediction, i.e. based on how precise the prediction was.

E.g., when indicating not acknowledged, the first radio node 110 updates the training model according to the indication wherein updating the training model is based on an accuracy of the prediction.

Action 209

As hinted above, the training model may be updated when the switching to the 20 second beam pair was not performed correctly. Further when the switching to the second beam pair was correct, e.g. when indicating acknowledged, the first radio node 110 may receive a second information, which may be the information at the next time instant, from the one or more other radio nodes 125. The second information comprises a number of quality values related to a number of beam pairs, wherein each beam pair out of the number of beam pairs is associated to at least one quality value out of the number of quality values. This is performed to evaluate the accuracy of the switching to the second beam pair. If the accuracy is high, the same switching method may be used. If the accuracy is low, changing of switching methods may be considered.

Action 210

When there is not enough time, the first radio node 110 prepares an upcoming beam pair failure. This may for example be restarting the P1, P2 and P3 processes, a beam recovery procedure or an initial access.

Action 211

As mentioned above, the training model may be updated based on an accuracy of the prediction.

Another example of this is when there is not enough time and when a decision is obtained that the predicted time to failure for the first beam pair was not correct, the first radio node 110 may update the training model according to the obtained decision wherein the updating of the training model is based on an accuracy of the prediction.

Embodiments herein such as mentioned above will now be further described and exemplified. The text below is applicable to and may be combined with any suitable embodiment described above.

Embodiments herein may comprise:

Training a learning algorithm such as the training model mentioned above, using beam quality values such as e.g. beam quality and block error rate as input and running the system, e.g. the first radio node 110, normally according to state of the art to acquire the target data. This will be explained below.

Predicting the time to failure for the first beam pair based on the number of quality values, e.g., to predict the occurrence of beam failures given beam quality and block error rate information.

Updating the training model based on an accuracy of the prediction such as maintain learning in real-time to ensure reliability.

Switching to the second beam pair before the predicted beam failure, if there is enough time.

An advantage of a cloud implementation of embodiments herein is that data may be shared between different machine learning models. This may allow for a faster training mode by establishing a common model based on all available input. During a prediction mode, separate models may be used for each site and link, which enables for site-specific models that are able to learn characteristics about that particular environment. This may be beneficial as different sites have different environments and therefore different signal behaviors. The machine learning model corresponding to a particular site, may be updated based on data, Acknowledge (ACK) or Not Acknowledged (NACK), from that site. This may result in models optimized to the specific characteristics of the site.

The training mode which is used to train the training model, such as the prediction model, and how the training model is used to predict the time to failure, referred to as the deployed prediction mode, will be described in the sections below.

Training Mode

During the training mode, which refers to action 202 described above, the processes such as P1, P2, P3 and beam indication with joint sweep is performed in order to acquire the output data, e.g. target data, used for training. The system for beam processes, e.g. the beam management process in the first radio node 110, is run normally according to the state of the art.

Figure 3:
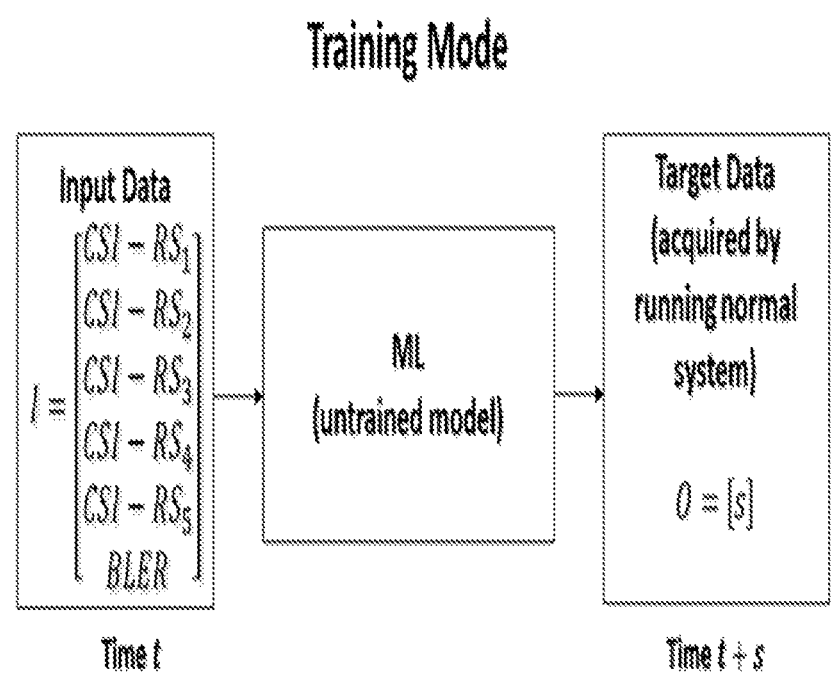
FIGS. 3-6 are schematic block diagrams illustrating embodiments herein.

Informative features, also referred to as the quality values in the first information, e.g. features that may provide an indication of how good a beam pair, such as a beam pair link, is may be used as input to the machine learning model. During an established beam pair, the second radio node 120 will have to perform P2 and P3 sweeps in order to keep the beams at TX and RX updated. The second radio node may perform a series of measurements that may comprise Reference Signal Received Power (RSRP) or Channel State Information-Reference Symbols (CSI-RS). For updating the beam pair, reports of CSI-RSs may be sent to the first radio node 110. The second radio node 120 will report back a certain number of these quality values, for example the N=5 strongest beam pairs, e.g. by the first radio node 110. This number N=5, is only an example. These CSI-RS quality values are used as input to the machine learning model. Another measurement that may be used for updating the beam pair, and used as quality values that may be used as input to the training model, is a Block Error Rate (BLER). This is a performance measurement used for radio link monitoring (RLM) and will also give an indication of how well the system, e.g. the system for beam processes, e.g. the beam management process in the first radio node 110, is performing. A quality of a communication link is yet another example of a measurement that may be used for updating the beam pair, and used as quality values that may be used as input to the training model. See FIG. 3 for an illustration of the training mode. As shown in FIG. 3, the inputs (I) and outputs (0) are of fixed dimension and remain the same for the prediction mode. The inputs to the untrained machine learning model may comprise the CSI-RS values and the BLER reported by the second radio node 120. This information is used to predict the time of the beam failure. Note that it is useful to predict the time steps ahead of time t, denoted s in the figure. This output is provided by running the system for beam processes, e.g. the beam management process in the first radio node 110 normally until beam failures occur. The machine learning (ML) model may be trained by minimizing a loss function for example Mean Squared Error (MSE). A loss function when used herein is a function mapping the difference between the estimated and real values for a particular instance. Note that the dimension of the input and the output need to remain fixed for both the training mode and the prediction mode, e.g. an online mode. This means that the same kind of quality value must be used for both the training mode and the prediction mode e.g. if BLER is used for the training mode it must also be used in the prediction mode. Thus, features used for training also need to be available during the prediction mode, e.g. the online mode. For the output data, there is interest in predicting the time in which a beam failure occurs as far ahead of time as possible using, for example, reported CSI-RS values and BLER. This is because a certain time is needed to switch to a new beam pair, referred to herein as the second beam pair, before the beam failure occurs.

Figure 4:
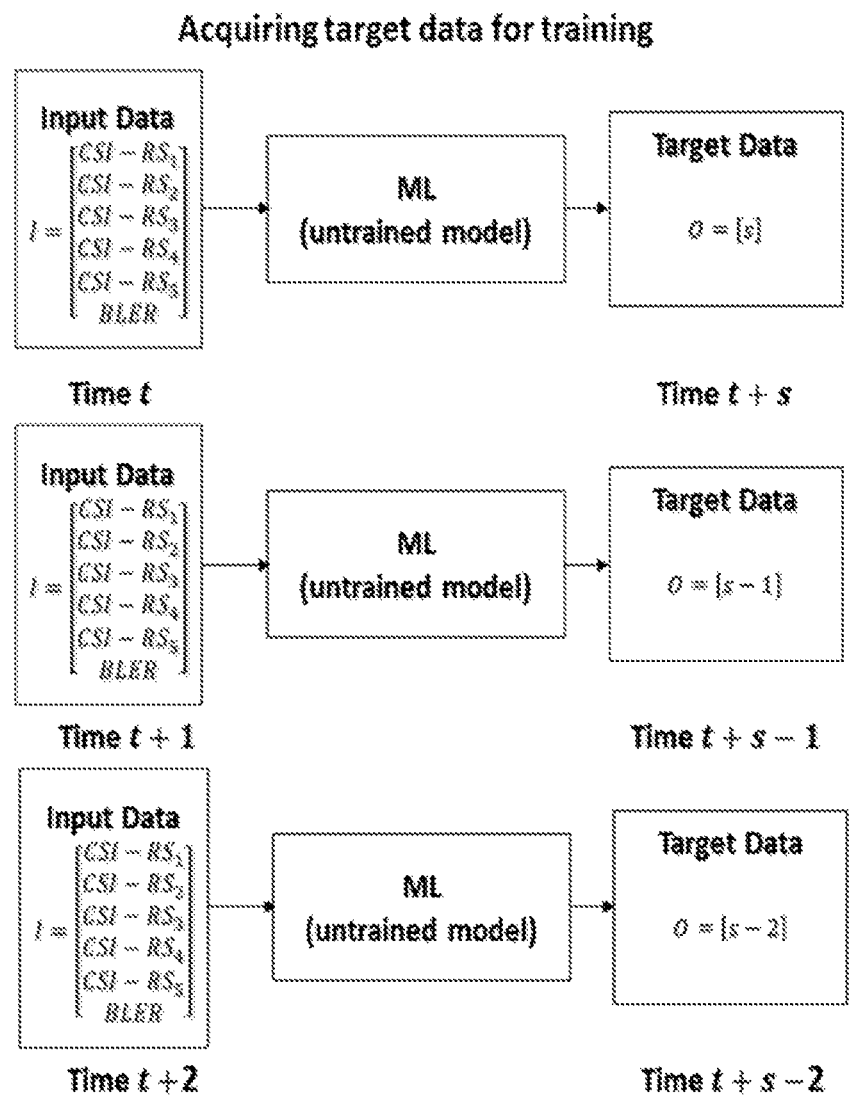
Figure 5:
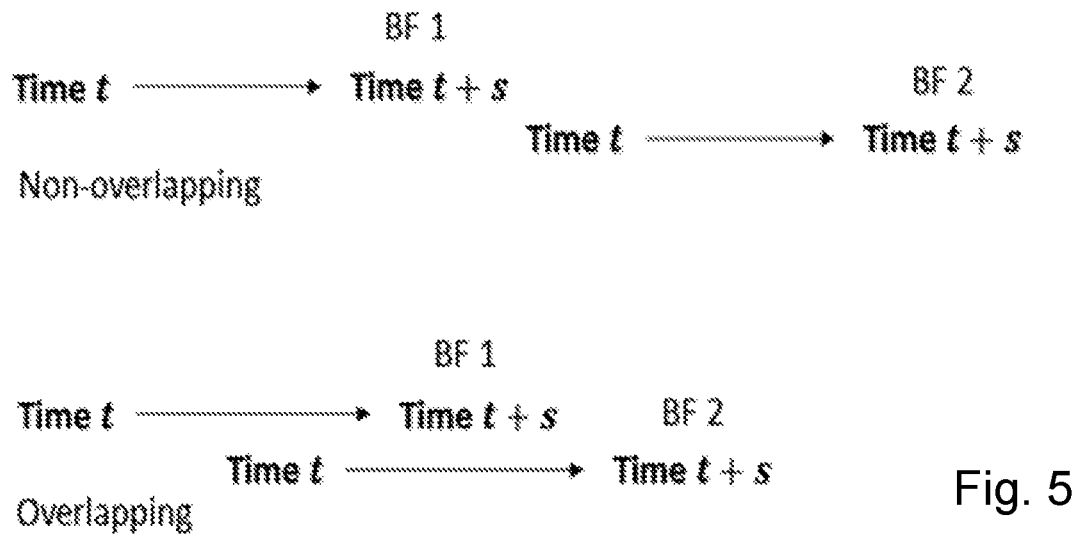

The process of acquiring the output data (0) to the machine learning model to be trained is shown in FIG. 4. At a time t, the second radio node 120 reports quality values, such as e.g. CSI-RS values, RSRP values and BLER. The system for beam processes e.g. the beam management process in the first radio node 110, is run normally until a beam failure occurs at a time t+s, where s is the number of time steps ahead of t. The quality values, such as CSI-RS values, RSRP values and BLER, at time t, may be used to predict an occurrence of a beam failure at time t+s. At the time step t+1, the quality values such as CSI-RS values, RSRP values and BLER that the second radio node 120 reported are already known. These quality values may be used as input (I) to the machine learning model to predict the time of the same beam failure, but now at a time t+s−1. It is advantageous for the model to learn that because being at time step t+1, is being one step closer to the time of the beam failure. The same procedure is done for the time of the next beam failure and so on. Note that the occurrence of Beam Failures (BF) may be overlapping or non-overlapping in terms of mapping the time of the quality values, such as CSI-RS values, RSRP values and BLER to the time of the beam failure. The wording beam failures being overlapping or non-overlapping when used herein means that a particular time instance may either be used for the prediction of multiple or one BF. The overlapping or non-overlapping of mapping the time of the quality values to the time of the BF is illustrated in FIG. 5. In FIG. 5 it is shown that it is possible to use a time t instance of CSI-RS values and BLER, as input several times for different beam failures. Mapping when used herein means the association of the time of the quality values to the time of the BF. It is possible to use a time instance of the quality values, such as CSI-RS values, RSRP values and BLER as input several times for different beam failures. The time of the beam failures is the output data to the machine learning model to be trained. Note again that this is supervised training, which means that there is a particular set of inputs and a known target data. These steps may be repeated until the machine learning model is trained and learns how to predict the time in which a beam failure occurs.

In the description above it is explained a possible way of how to use the information at time t to predict a beam failure at time t+s, It is also possible to use information from multiple time instants t−k, t−k+1, . . . , t−t, t to predict a beam failure at time t+s.

It is favorable to choose a good machine learning method for this particular procedure. The sequential information is useful here because it will give an indication of the quality of the beam pair over time and when it is about to fail. Therefore, it would be favorable to use a recurrent neural network or long short-term memory network. The learning architectures that have a form of memory and takes time into account may be used. These structures are able to take the sequential information into account.

Prediction Mode

Figure 6:
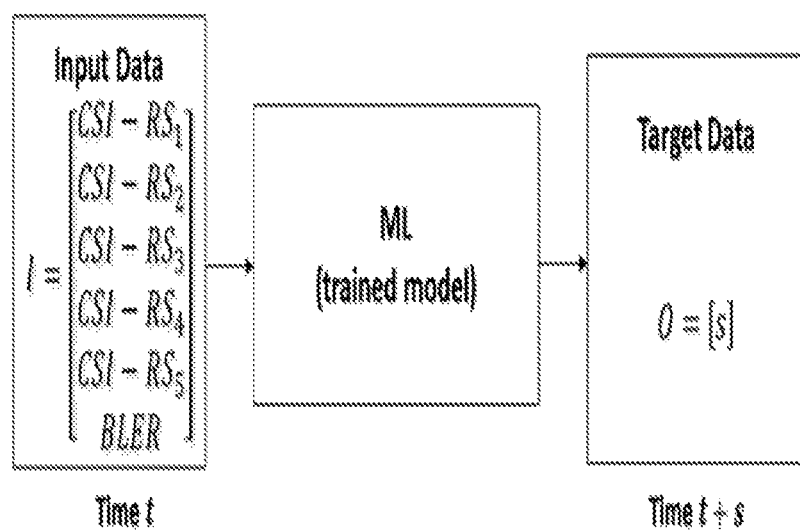

In the prediction mode, e.g. online mode, see FIG. 6, the dimensions of the input and output remain the same as in the training mode, which as mentioned above means that the same kind of quality value must be used for both the training mode and the prediction mode e.g. if CSI-RS is used for the training mode it must also be used in the prediction mode. Here, the system for beam processes e.g. beam management process in the first radio node 110 is no longer run normally according to state of the art. The goal here is to prevent the beam failures. The training model that has been trained to predict the time of a beam failure based on, e.g. RSRP values, CSI-RS values and BLER, is used.

The refined learning method used to maintain reliable estimates during prediction mode is highlighted. There is an opportunity to check whether the prediction of the time of beam failure is correct. This information is used to update the trained machine learning model accordingly. Note that the model is only updated when the prediction is not correct, however, other more advanced updating methods may be used.

An advantage of embodiments herein is that the flexibility to use different machine learning models is enabled, wherein machine learning techniques that have a memory and take sequential information into account, such as recurrent neural networks and long-short term memory, may be used.

According to some example embodiments, actions involved in the prediction mode will be described with reference to FIG. 7. In an example scenario, the first radio node 110 is about to communicate with the second radio node 120 over a specific beam pair, this is the first beam pair. The first radio node 110 will use the trained training model to find out a time to failure for the first beam pair. The first beam pair comprises a TX beam and an RX beam.

Action 700

Figure 7:
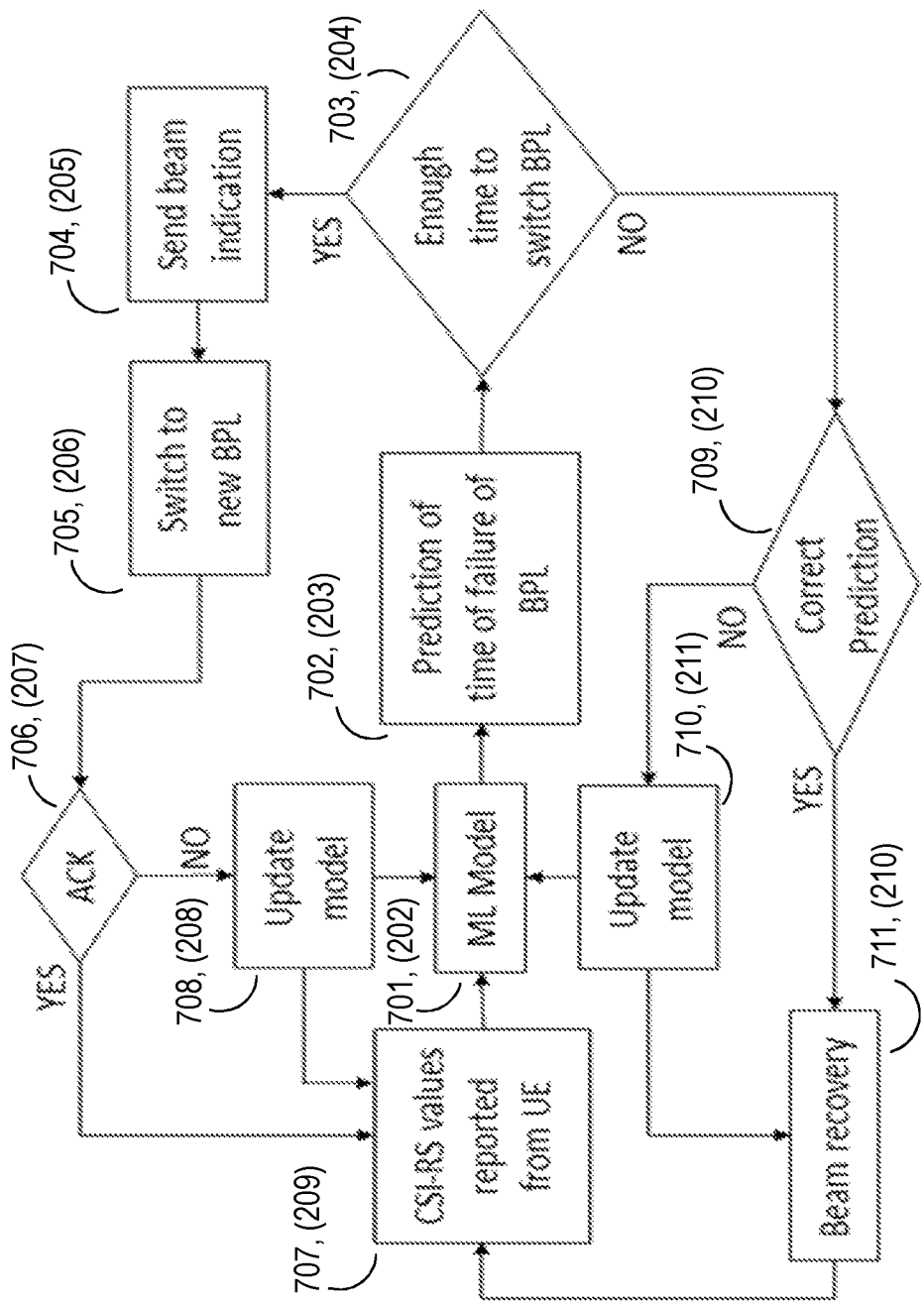
FIG. 7 is a flow chart showing embodiments herein.

As described above, the second radio node 120 referred to as UE in FIG. 7, performs measurements to collect information on certain beams by performing a sweep of its RX and TX beams to find the first beam pair and reports the measurement of the first beam pair to the first radio node 110. The measurement comprises the first quality values, represented by CSI-RS values and/or BLER in this example, related to the first beam pair.

Action 701

The trained training model, referred to as a Machine Learning (ML) Model in FIG. 7 will in this action now be applied for the first beam pair. The reported first quality values, represented by the CSI-RS values and/or BLER values in this example, received by the first radio node 110, is then fed into the trained training model to be provided as output in next action for obtaining a predicted time to failure for the first beam pair. This relates to actions 202 mentioned above.

Action 702

After feeding the trained training model with the first quality values, represented by CSI-RS values and/or BLER of the first beam pair referred to as BPL in FIG. 7, a predicted time to failure for the first beam pair will be provided as output.

The quality values of the specific beam pair is thus fed to the trained training model, e.g. in form of the CSI-RS values and/or the BLER values and an estimate of when a beam failure is expected to occur will be provided as output.

As mentioned above, in the situations when the training model has been trained, the predicting of the time to failure for the first beam pair is based on the first quality values and the trained training model representing the number of quality values. This relates to action 203 mentioned above.

Action 703

When the time to failure for the first beam pair has been predicted, the first radio node 110 then decides whether there is enough time to switch to another beam pair. This may be done by comparing the predicted time it takes to switch beams to the minimum time it takes to switch beams. The minimum time to switch beams may also include the time it takes to send a beam indication. This relates to action 204 mentioned above.

Actions 704

When there is enough time to switch to another beam pair, a beam indication may be sent to the second radio node 120. The beam indication is used to establish the second beam pair. The beam indication may comprise of an exchange of information between the TX and RX so that simultaneous beam switching can be performed. This relates to action 205 described above.

Action 705

The first radio node 110 then switches to the second beam pair before the predicted time to failure There are several ways to establish the second beam pair. One way is to perform a P2 sweep with the second best CSI-RS value provided by the second radio node 120 providing the second best TX beam to be used in the new second beam pair.

Another option, since there is access to the list of reported second radio node measurements, for example the N=5, i.e. five, strongest beam pairs used as input to the machine learning model, it is possible to switch to the second best beam pair directly. Different switching methods will depend on the predicted time of failure. This relates to action 206 described above.

Action 706

After the second beam pair is established, an indication of acknowledged (ACK) or not acknowledged (NACK) may be used to feed back the uncertainty of the time of failure estimate. This relates to action 207 mentioned above.

Action 707

An ACK indication, may mean returning to the CSI-RS values reporting such as action 700, i.e. the first radio node 110 receives a new second information from the second radio node 120 comprising a second CSI-RS value measured for the new established second beam pair. This second CSI-RS value may be used as an accuracy indication for the method used to establish the second beam pair. If the accuracy is low, a change of beam switching methods may be performed. This relates to action 209 mentioned above.

Action 708

A NACK indication may trigger an update of the trained training model, i.e. the ML model, before the second radio node 120, such as the UE, reports the CSI-RS value of the NACKed beam pair to the first radio node 110. This means that the accuracy of the ML model is low and an update may be performed to compensate for the, for example, change in environment. The CSI-RS values reported are then sent to the ML model, i.e. the trained training model. Note that it is possible to decide to only update the model based on several consecutive NACKs instead of one. This relates to action 208 described above.

Action 709

If there instead is not enough time to switch beams, there is an opportunity to decide whether the estimation of the time of beam failure is correct. This may be used as an indication of the uncertainty of the prediction. Both prediction scenarios, i.e. whether the prediction is correct or not, may result in a fallback solution which is to prepare an upcoming beam pair failure, which may for example be to restart the P1, P2 and P3 processes, run the beam recovery procedure, or run the initial access. This relates to action 210 mentioned above.

Action 710

However, when decided that the predicted time to failure for the first beam pair was not correct, the trained training model, i.e. the ML model, may be updated according to this decision. This relates to action 211 mentioned above.

Action 711

If the prediction of the time to failure instead was correct an upcoming beam failure will be prepared. The cycle then starts again with the second radio node 120 reporting to the first radio node 110, a quality value such as a CSI-RS related to a new beam pair This relates to action 210 mentioned above.

In the description of the actions above, it is assumed that the training model is trained at the TX. The second radio node 120 transmits the required information to the TX. However, the model may be remotely trained at sites with more capabilities if this is required. This would require extra signaling. A site when used herein may be any form of cell or geographical area with for example a base station providing network coverage to that area or cell. The embodiments and examples herein are not limited to being handled by the TX.

Preventing beam failures may be efficient by learning the environment where the access point is operating. There may be different prediction models for each site. Sites typically have different environments and having a separate prediction model per site will be advantageous as the machine learning model will be able to learn the environment. The model will learn when beam failures are about to happen based on CSI-RS values and BLER. Other available features may also be used as input such as e.g. SNR, SINR and traffic information.

A possible fall back procedure may be to run the system according to the state of the art, by for example beam recovery mechanisms. This may occur if there is not enough time to switch to a new beam pair. It may also occur unexpectedly, in which case the recovery mechanism may need to be run as well.

Reinforcement learning may also be used to explore parameter settings not encountered during training.

Figure 8A:
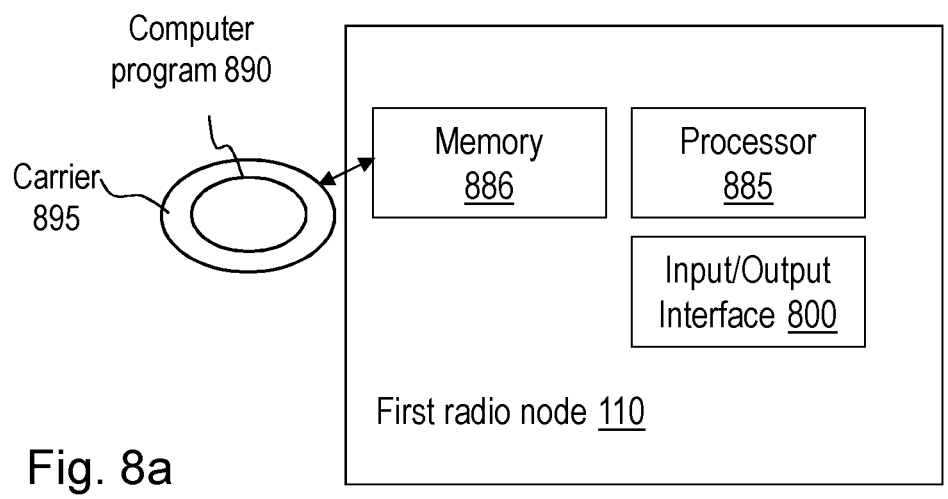
FIGS. 8a and 8b are schematic block diagrams illustrating embodiments of a radio node.
Figure 8B:
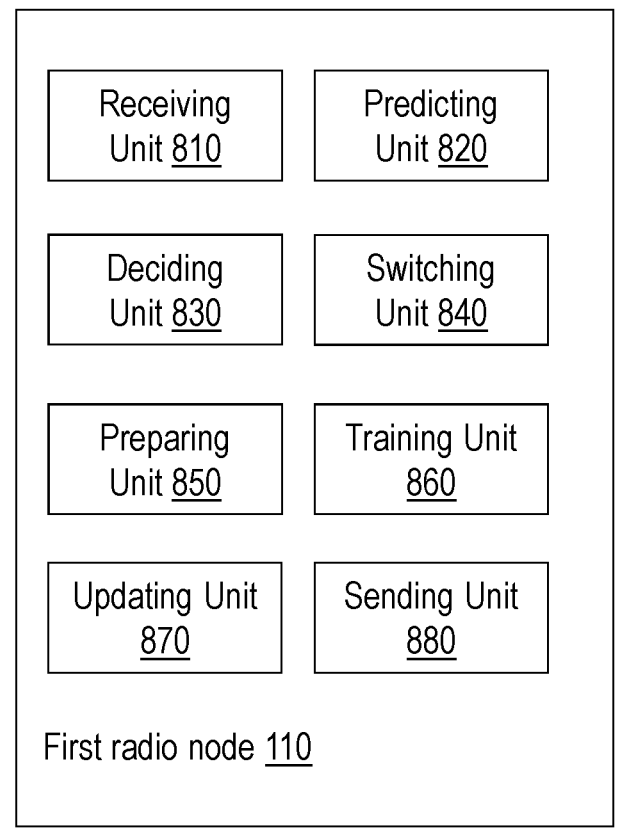

To perform the method actions above for handling a beam pair with a second radio node 120, the first radio node 110 may comprise the arrangement depicted in FIGS. 8a and 8b. As mentioned above, the first radio node 110, the second radio node 120 and the one or more other radio nodes 125 are operable in the wireless communications network 100. The first radio node 110, may be represented by anyone out of: a network node, a wireless communication device, and a cloud 130.

The first radio node 110 may comprise an input and output interface 800 configured to communicate e.g. with the second radio node 120. The input and output interface 800 may comprise a wireless receiver (not shown) and a wireless transmitter (not shown).

The first radio node 110 is configured to, e.g. by means of a receiving unit 810 in the first radio node 110, receive a first information from respective one or more other radio nodes 125. The first information is adapted to comprise a number of quality values related to a number of beam pairs. Each beam pair out of the number of beam pairs is adapted to associate to at least one quality value out of the number of quality values.

According to some embodiments, the first radio node 110 further is configured to e.g. by means of the receiving unit 810 in the first radio node 110, after switching to the second beam pair, receive an indication, indicating whether or not the switching to the second beam pair is acknowledged.

According to some embodiments, the first radio node 110 further is configured to e.g. by means of the receiving unit 810 in the first radio node 110, when indicating acknowledged, receive a second information from the second radio node 120. The second information is adapted to comprise a number of quality values related to a number of beam pairs, and wherein each beam pair out of the number of beam pairs is adapted to be associated to at least one quality value out of the number of quality values.

The first radio node 110 is further configured to, e.g. by means of a predicting unit 820 in the first radio node 110, predict a time to failure for a first beam pair between the first radio node 110 and the second radio node 120, which first beam pair is adapted to have a first quality value, and wherein the predicting is adapted to be based on the first quality value and the number of quality values.

According to some embodiments, the first radio node 110 further is configured to e.g. by means of the predicting unit 820 in the first radio node 110, predict the time to failure for the first beam pair by basing it on the first quality value, and the trained training model.

The first radio node 110 is configured to, e.g. by means of a deciding unit 830 in the first radio node 110, decide whether or not there is enough time until the predicted time to failure, for performing a beam pair switch from the first beam pair to a second beam pair between the first radio node 110 and the second radio node 120.

The first radio node 110 is configured to, e.g. by means of a switching unit 840 in the first radio node 110, when there is enough time, switch to the second beam pair before the predicted time to failure, The first radio node 110 is configured to, e.g. by means of a preparing unit 850 in the first radio node 110, when there is not enough time, prepare an upcoming beam pair failure.

The first radio node 110 may further be configured to, e.g. by means of a training unit 860 in the first radio node 110, train a training model by inputting the number of quality values related to the number of beam pairs, and obtaining the time to failure for the respective beam pair out of the number of beam pairs The first radio node 110 may further be configured to, e.g. by means of an updating unit 870 in the first radio node 110, update the training model based on an accuracy of the predicted time to failure for the first beam pair.

According to some embodiments, the first radio node 110 is further configured to e.g. by means of the updating unit 870 in the first radio node 110, update the training model based on an accuracy of the prediction by updating the training model according to the indication.

The first radio node 110 may further be configured to e.g. by means of the updating unit 870 in the first radio node 110, when there is not enough time, and when a decision is obtained that the predicted time to failure for the first beam pair was not correct, update the training model is based on an accuracy of the prediction by updating the training model according to the decision.

The first radio node 110 may further be configured to, e.g. by means of a sending unit 880 in the first radio node 110, when there is enough time, send, a beam indication to the second radio node 120, for establishing the second beam pair, before switching to the second beam pair.

The embodiments herein may be implemented through a respective processor or one or more processors, such as a processor 885 of a processing circuitry in the first radio node 110 depicted in FIG. 8b, together with a respective computer program code for performing the functions and actions of the embodiments herein. The program code mentioned above may also be provided as a computer program product, for instance in the form of a data carrier carrying computer program code for performing the embodiments herein when being loaded into the first radio node 110. One such carrier may be in the form of a CD ROM disc. It is however feasible with other data carriers such as a memory stick. The computer program code may furthermore be provided as pure program code on a server and downloaded to the first radio node 110.

The first radio node 110 may further comprise a memory 886 comprising one or more memory units. The memory comprises instructions executable by the processor 885. The memory 886 is arranged to be used to store e.g. quality values related to a number of beam pairs, predicted time to failure, data, configurations and applications to perform the methods herein when being executed in the first radio node 110.

Those skilled in the art will also appreciate that the units in the first radio node 110 mentioned above may refer to a combination of analog and digital circuits, and/or one or more processors configured with software and/or firmware, e.g. stored in the first radio node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 890 comprises instructions, which when executed by the respective at least one processor 885, cause the at least one processor 885 of the first radio node 110 to perform the actions above.

In some embodiments, a carrier 895 comprises the computer program 890, wherein the carrier 895 is one of an electronic signal, an optical signal, an electromagnetic signal, a magnetic signal, an electric signal, a radio signal, a microwave signal, or a computer-readable storage medium.

Further Extensions and Variations

Figure 9:
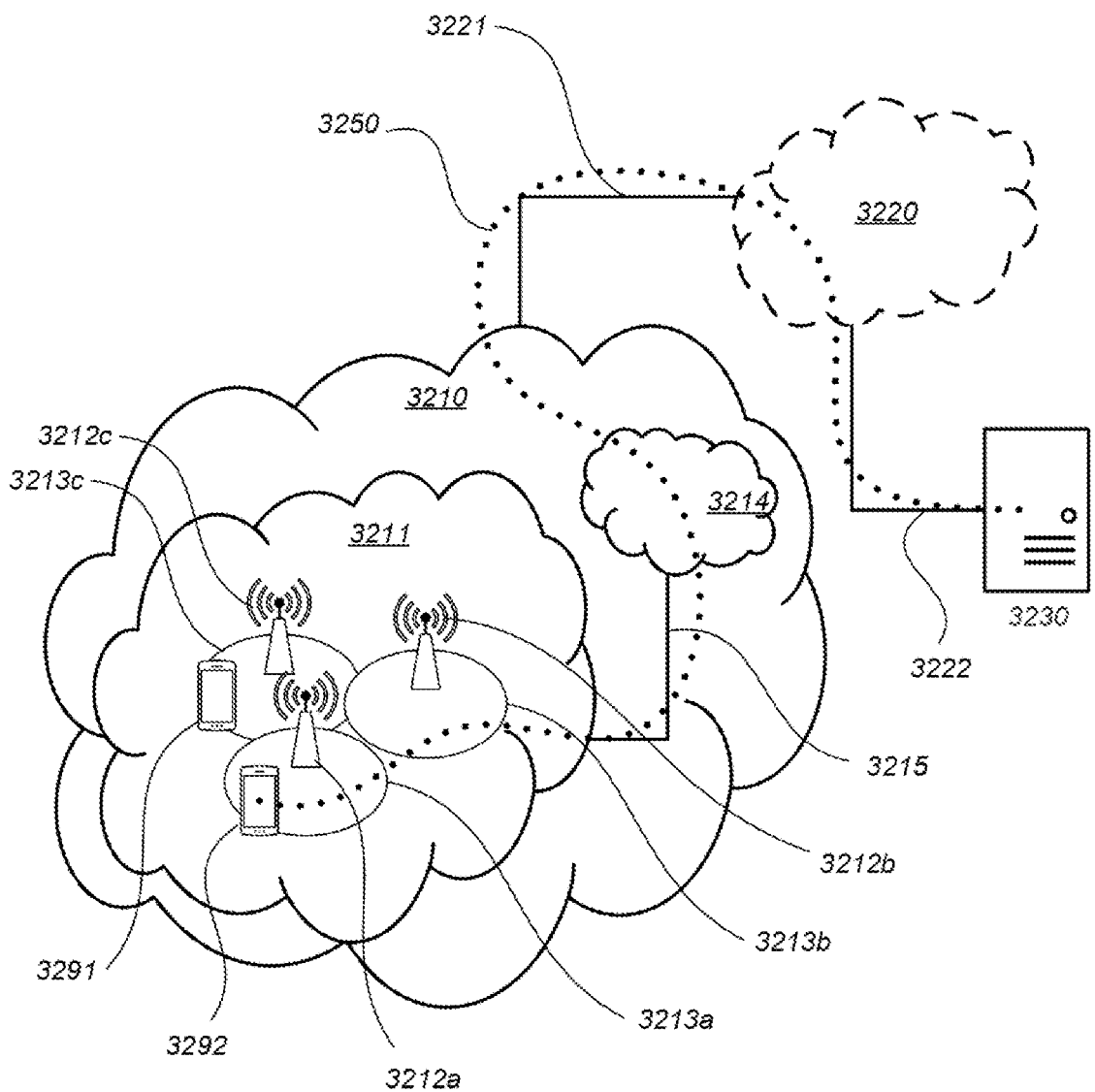
FIG. 9 schematically illustrates a telecommunication network connected via an intermediate network to a host computer.

With reference to FIG. 9, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the first, or second radio nodes 110, 120, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the first, second or one or more other radio nodes 110, 120, 125 such as a Non-AP STA 3291 located in coverage area 3213c is configured to wirelessly connect to, or be paged by, the corresponding base station 3212c. A second UE 3292 e.g. the first, second or one or more other radio nodes 110, 120, 125 or such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
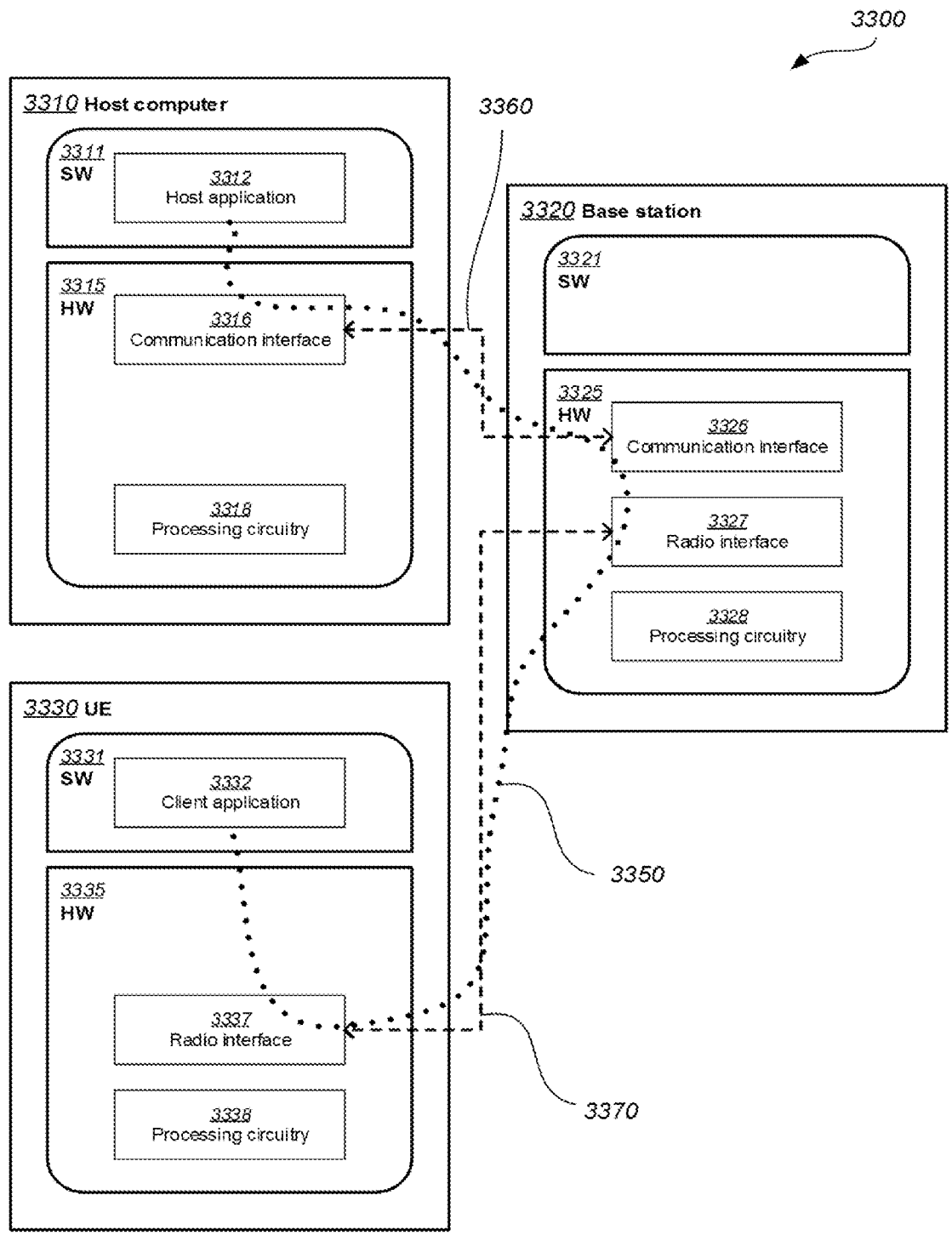
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9 respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
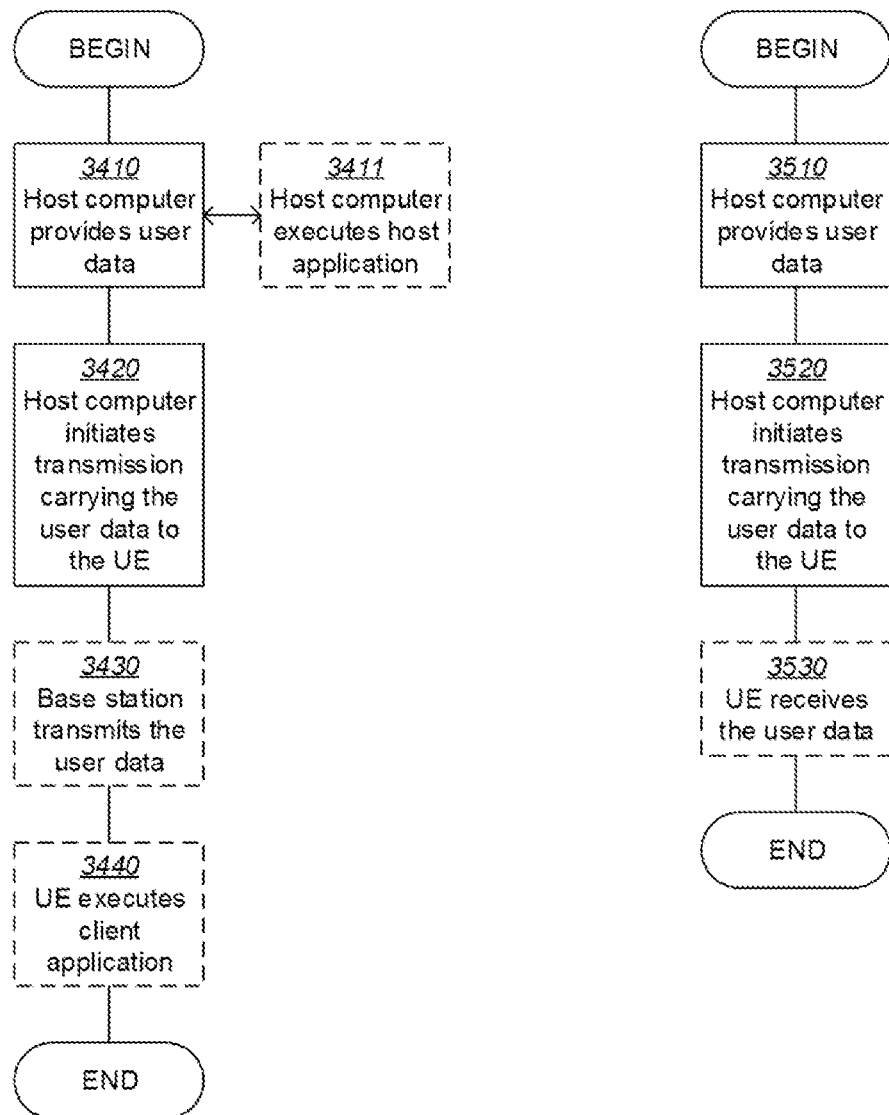
FIGS. 11 to 14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 13, 14:
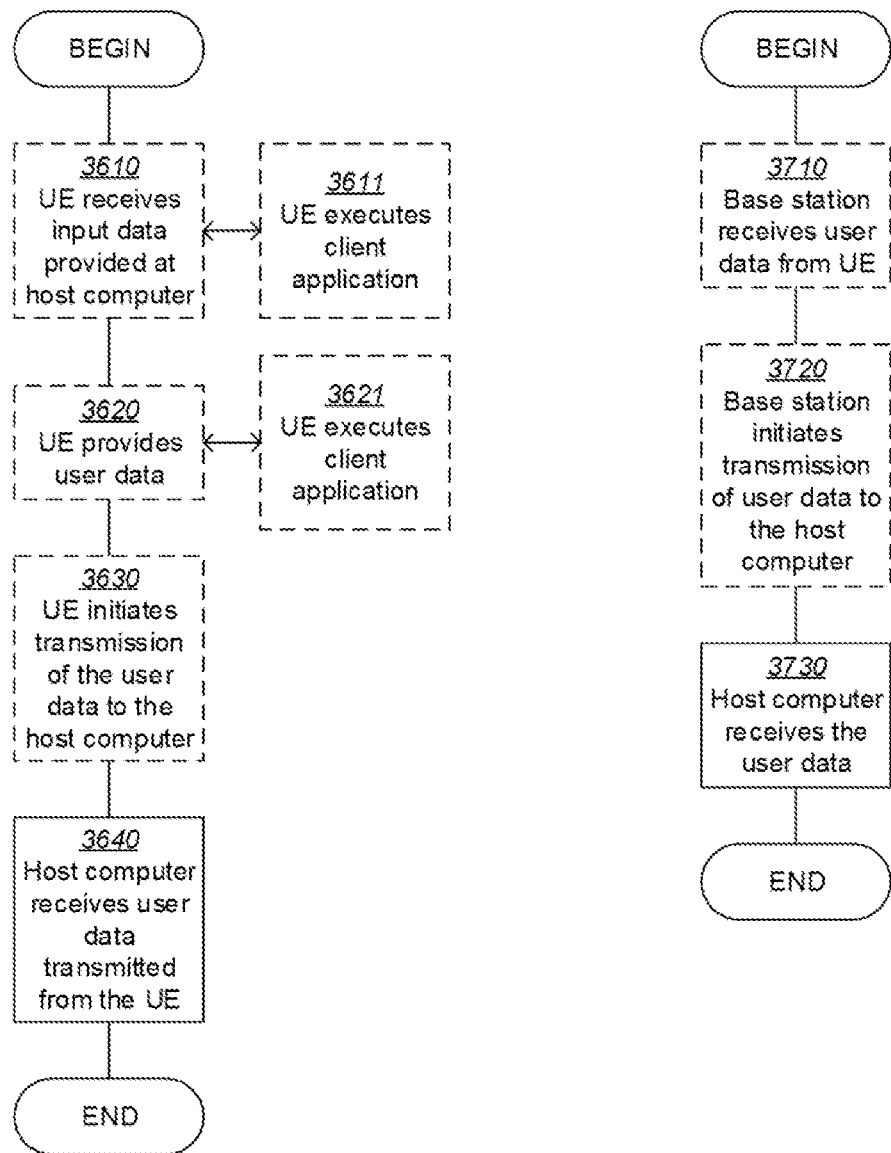

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| ML | Machine Learning |
| UE | User Equipment |
| TP | Transmission Point |
| mmWave | Millimeter Wave communication |
| CSI-RS | Channel State Information Reference Symbols |
| MAC-CE | Multiplexed Analogue Components Control Element |
| MIMO | Multiple-Input Multiple Output |
| ACK | Acknowledgement |
| NACK | Negative Acknowledgement |
| RSRP | Reference Signal Received Power |
| BLER | Block Error Rate |
| SINR | Signal-to-Interference-plus-Noise Ratio |
| SNR | Signal-to-Noise Ratio |
| DCI | Downlink Control Information |
| BPL | Beam Pair Link |
| TX | Transmitter |
| RX | Receiver |
| RS | Reference Sequence |
| SS | Synchronization |
| Nt | Number of TX antennas |
| Nr | Number of RX antennas |

The invention claimed is:

1. A method for handling a beam pair between a first radio node and a second radio node, which first radio node, the second radio node and one or more other radio nodes operate in a wireless communication network, the method comprising:
   receiving a first information from respective one or more other radio nodes, which first information comprises a number of quality values related to a number of beam pairs, each beam pair out of the number of beam pairs being associated to at least one quality value out of the number of quality values;
   predicting a time to failure for a first beam pair between the first radio node and the second radio node, which first beam pair has a first quality value, the predicting being based on the first quality value and the number of quality values; and
   deciding whether there is enough time until the predicted time to failure, for performing a beam pair switch from the first beam pair to a second beam pair between the first radio node and the second radio node;
   when there is enough time, switching to the second beam pair before the predicted time to failure;
   when there is not enough time, preparing an upcoming beam pair failure;
   training a training model by inputting the number of quality values related to the number of beam pairs, and obtaining the time to failure for the respective beam pair out of the number of beam pairs; and
   predicting the time to failure for the first beam pair further based on the first quality value, and the trained training model.

2. The method according to claim 1, further comprising:
   updating the training model based on an accuracy of the predicted time to failure for the first beam pair.

3. The method according to claim 1, wherein the method further comprises:
   when there is enough time, sending a beam indication to the second radio node for establishing the second beam pair, before switching to the second beam pair.

4. The method according to claim 1, the method further comprising:
   after switching to the second beam pair, receiving an indication, indicating whether the switching to the second beam pair is acknowledged; and when indicating is not acknowledged, updating the training model based on an accuracy of the prediction comprises updating the training model according to the indication; and when indicating is acknowledged, receiving a second information from the second radio node, which second information comprises a number of quality values related to a number of beam pairs, wherein each beam pair out of the number of beam pairs is associated to at least one quality value out of the number of quality values.

5. The method according to claim 1, wherein there is not enough time, and when a decision is obtained that the predicted time to failure for the first beam pair was not correct, the updating of the training model based on an accuracy of the prediction comprises updating the training model according to the obtained decision.

6. The method according to claim 1, wherein the method is performed by anyone of: a network node, a wireless communication device, and a cloud.

7. A non-transitory computer storage medium storing a computer program comprising instructions, which when executed by a processor, cause the processor to:

receive a first information from respective one or more other radio nodes, which first information comprises a number of quality values related to a number of beam pairs, each beam pair out of the number of beam pairs being configured to associate to at least one quality value out of the number of quality values;

predict a time to failure for a first beam pair between the first radio node and the second radio node, which first beam pair is adapted to have a first quality value, the predicting being configured to be based on the first quality value and the number of quality values;

decide whether there is enough time until the predicted time to failure for performing a beam pair switch from the first beam pair to a second beam pair between the first radio node and the second radio node;

when there is enough time, switch to the second beam pair before the predicted time to failure;

when there is not enough time, prepare an upcoming beam pair failure;

train a training model by inputting the number of quality values related to the number of beam pairs, and obtaining the time to failure for the respective beam pair out of the number of beam pairs; and predict the time to failure for the first beam pair further based on the first quality value, and the trained training model.

8. A first radio node for handling a beam pair with a second radio node, which first radio node, second radio node and one or more other radio nodes are operable in a wireless communications network, the first radio node being configured to:

receive a first information from respective one or more other radio nodes, which first information comprises a number of quality values related to a number of beam pairs, each beam pair out of the number of beam pairs is configured to associate to at least one quality value out of the number of quality values;

predict a time to failure for a first beam pair between the first radio node and the second radio node, which first beam pair is adapted to have a first quality value, the predicting is configured to be based on the first quality value and the number of quality values;

decide whether there is enough time until the predicted time to failure for performing a beam pair switch from the first beam pair to a second beam pair between the first radio node and the second radio node;

when there is enough time, switch to the second beam pair before the predicted time to failure;

when there is not enough time, prepare an upcoming beam pair failure;

train a training model by inputting the number of quality values related to the number of beam pairs, and obtaining the time to failure for the respective beam pair out of the number of beam pairs; and predict the time to failure for the first beam pair further based on the first quality value, and the trained training model.

9. The first radio node according to claim 8, further configured to update the training model based on an accuracy of the predicted time to failure for the first beam pair.

10. The first radio node according to claim 8, further configured to:

when there is enough time, send a beam indication to the second radio node for establishing the second beam pair, before switching to the second beam pair.

11. The first radio node according to claim 8, further configured to:

after switching to the second beam pair, receive an indication, indicating whether the switching to the second beam pair is acknowledged;

when indicating is not acknowledged, update the training model based on an accuracy of the prediction by updating the training model according to the indication; and when indicating is acknowledged, receive a second information from the second radio node, which second information is configured to comprise a number of quality values related to a number of beam pairs, and wherein each beam pair out of the number of beam pairs is configured to be associated to at least one quality value out of the number of quality values.

12. The first radio node according to claim 8, further configured to:

when there is not enough time, and when a decision is obtained that the predicted time to failure for the first beam pair was not correct, update the training model is based on an accuracy of the prediction by updating the training model according to the decision.

13. The first radio node according to claim 8, wherein the first radio node is anyone of: a network node, a wireless communication device, and a cloud.

14. The method according to claim 1, further comprising:
updating the training model based on an accuracy of the predicted time to failure for the first beam pair.

15. The method according to claim 1, the method further comprising:

when there is enough time, sending a beam indication to the second radio node for establishing the second beam pair, before switching to the second beam pair.

16. The method according to claim 1, the method further comprising:

after switching to the second beam pair, receiving an indication, indicating whether the switching to the second beam pair is acknowledged; and when indicating is not acknowledged, updating the training model based on an accuracy of the prediction comprises updating the training model according to the indication; and when indicating is acknowledged, receiving a second information from the second radio node, which second information comprises a number of quality values related to a number of beam pairs, wherein each beam pair out of the number of beam pairs is associated to at least one quality value out of the number of quality values.

17. The method according to claim 1, wherein there is not enough time, and when a decision is obtained that the predicted time to failure for the first beam pair was not correct, the updating of the training model based on an accuracy of the prediction comprises updating the training model according to the obtained decision.

18. The method according to claim 1, wherein the method is performed by anyone of: a network node, a wireless communication device, and a cloud.

* * * * *